United States Patent
Bettersworth et al.

(10) Patent No.: US 10,061,766 B2
(45) Date of Patent: Aug. 28, 2018

(54) SYSTEMS AND METHODS FOR DOMAIN-SPECIFIC MACHINE-INTERPRETATION OF INPUT DATA

(71) Applicant: Texas State Technical College System, Waco, TX (US)

(72) Inventors: Michael Bettersworth, Austin, TX (US); Matt Patterson, Austin, TX (US)

(73) Assignee: Texas State Technical College System, Waco, TX (US)

( * ) Notice: Subject to any disclaimer, the term of this patent is extended or adjusted under 35 U.S.C. 154(b) by 0 days.

(21) Appl. No.: 15/220,248

(22) Filed: Jul. 26, 2016

(65) Prior Publication Data

US 2017/0031894 A1 Feb. 2, 2017

Related U.S. Application Data (60) Provisional application No. 62/197,474, filed on Jul. 27, 2015.

(51) Int. Cl.
G06F 17/27 (2006.01)
G06N 99/00 (2010.01)

(52) U.S. Cl.
CPC ........ *G06F 17/277* (2013.01); *G06F 17/2705* (2013.01); *G06F 17/2785* (2013.01); *G06N 99/005* (2013.01)

(58) Field of Classification Search
CPC ...... G06F 17/28; G06F 17/30; G06F 17/2785; G10L 15/19

(Continued)

(56) References Cited

U.S. PATENT DOCUMENTS 6,728,695 B1 4/2004 Pathria et al.
6,917,952 B1 7/2005 Dailey et al.
(Continued)

FOREIGN PATENT DOCUMENTS

EP 1769376 A2 4/2007
WO WO-0193102 A1 12/2001
(Continued)

OTHER PUBLICATIONS

Webpage "removing duplicate in an unsorted list" Mar. 7, 2013 Archive.*

(Continued)

*Primary Examiner* — Pierre-Louis Desir
*Assistant Examiner* — Yi-Sheng Wang
(74) *Attorney, Agent, or Firm* — Winstead PC (57) ABSTRACT

In an embodiment receiving input data over a computer network. The method also includes automatically generating topic-based metadata of the input data in relation to a multi-level taxonomy. The method also includes automatically determining parts of speech of tokens of the input data. The method also includes searching a metadata store using the tokens and the parts of speech, the searching including identifying, at a first level and a second level of the multi-level taxonomy, nodes that include metadata which sufficiently match the tokens and the parts of speech of the tokens, where the searching yields best-match grammar-based metadata. The method of also includes revising the best-match grammar-based metadata based at least in part on the automatically generated topic-based metadata.

18 Claims, 7 Drawing Sheets

(58) Field of Classification Search
USPC ............................... 704/9; 707/723, 740
See application file for complete search history.

(56) References Cited

U.S. PATENT DOCUMENTS

| | | | |
|---|---|---|---|
| 6,965,861 | B1 | 11/2005 | Dailey et al. |
| 7,761,320 | B2 | 7/2010 | Fliess et al. |
| 8,255,347 | B2 | 8/2012 | Ellingsworth |
| 2005/0267934 | A1 | 12/2005 | Brown et al. |
| 2006/0074743 | A1 | 4/2006 | Brown et al. |
| 2006/0084046 | A1 | 4/2006 | Brown et al. |
| 2006/0111932 | A1 | 5/2006 | Brown et al. |
| 2007/0136256 | A1* | 6/2007 | Kapur ............... G06F 17/3069 |
| 2007/0282598 | A1* | 12/2007 | Waelti ............... G06F 17/2785 704/10 |
| 2008/0065633 | A1 | 3/2008 | Luo et al. |
| 2008/0270120 | A1* | 10/2008 | Pestian ............... G06F 17/2785 704/9 |
| 2011/0040695 | A1 | 2/2011 | Wasicek et al. |
| 2011/0055041 | A1 | 3/2011 | Shaw et al. |
| 2011/0161333 | A1 | 6/2011 | Langseth et al. |
| 2012/0251985 | A1* | 10/2012 | Steels ............... G09B 5/00 434/156 |
| 2013/0268534 | A1 | 10/2013 | Mathew et al. |
| 2013/0290317 | A1* | 10/2013 | Spivack ............... G06F 17/275 707/723 |
| 2014/0129213 | A1 | 5/2014 | Kimelfeld et al. |
| 2014/0282586 | A1* | 9/2014 | Shear ............... G06F 9/5072 718/104 |
| 2014/0344718 | A1 | 11/2014 | Rapaport et al. |
| 2016/0260430 | A1* | 9/2016 | Panemangalore .. G10L 15/1822 |

FOREIGN PATENT DOCUMENTS

| | | |
|---|---|---|
| WO | WO-2005114445 A2 | 12/2005 |
| WO | WO-2006039270 A2 | 4/2006 |
| WO | WO-2006039384 A2 | 4/2006 |
| WO | WO-2006039390 A2 | 4/2006 |

OTHER PUBLICATIONS

Patterson, Matt; "Digging Deeper into Skills"; http://dev.skillsengine.com/blog; Jun. 30, 2016; 3 pages.

Texas Workforce Commission; "The Texas Detailed Work Activities Common Language Project: Developing a Skills-Based Talent Management System"; Jul. 27, 2012; http://www.texasworkforce.org; 38 pages.

Hamilton, Reeve; "TSTC Launches Center for Employability Outcomes"; The Texas Tribune; Jul. 29, 2014; 5 pages.

Center for Employability Outcomes (C4EO); "About C4EO"; http://www.c4eo.org/#!about/cahw; accessed on Jul. 20, 2015; 2 pages.

Center for Employability Outcomes (C4EO); "SkillsEngine™ Profile Builder"; http://www.c4eo.org/#!profile-builder/cpcm; accessed on Jul. 20, 2015; 2 pages.

Rowh, Mark; "Amarillo College Case Study"; http://www.c4eo.org/#!amarillo-college/cvx5; accessed on Jul. 20, 2015; 5 pages.

Potier, Paul; "Austin Community College Case Study"; http://www.c4eo.org/#!austin-community-college/cnf9; accessed on Jul. 20, 2015; 2 pages.

Center for Employability Outcomes (C4EO); "Curriculum Alignment Initiative"; http://www.c4eo.org/#!curriculum-alignment/c9mu; accessed on Jul. 20, 2015, 2 pages.

Center for Employability Outcomes (C4EO); "The SkillsEngine™ Competency API"; http://www.c4eo.org/#!competency-api/c20j2; accessed on Jul. 20, 2015, 1 page.

Center for Employability Outcomes (C4EO); "Skills Library Initiative"; http://www.c4eo.org/#!skills-library/ce9c; accessed on Jul. 20, 2015, 5 pages.

Center for Employability Outcomes (C4EO); "Initiatives Overview"; http://www.c4eo.org/#!initiatives/cihc; accessed on Jul. 20, 2015, 1 page.

Center for Employability Outcomes (C4EO); "Skills Translation"; http://www.c4eo.org/#!skill-translation/c1x19; accessed on Jul. 20, 2015, 1 page.

Center for Employability Outcomes (C4EO); "Skills Validation Initiative"; http://www.c4eo.org/#!skills-validation/c1oji; accessed on Jul. 20, 2015, 1 page.

Center for Employability Outcomes (C4EO); "Future Plans . . . Building Sustainable Innovations"; http://www.c4eo.org/#!future-plans/c1s3h; accessed on Jul. 20, 2015, 1 page.

Center for Employability Outcomes (C4EO); "Common Skills Language Platform Concept"; http://www.c4eo.org/#!concept/chb2; accessed on Jul. 20, 2015, 1 page.

Center for Employability Outcomes (C4EO); "History and Platform Development"; http://www.c4eo.org/#!history/c1iqc; accessed on Jul. 20, 2015, 1 page.

Center for Employability Outcomes (C4EO); "Common Skills Language Platform Overview"; http://www.c4eo.org; accessed on Jul. 20, 2015, 1 page.

Reamy, Tom; "Improving Search for Discovery"; KAPS Group; Dec. 19, 2015; 21 pages.

* cited by examiner

SYSTEMS AND METHODS FOR DOMAIN-SPECIFIC MACHINE-INTERPRETATION OF INPUT DATA

CROSS-REFERENCE TO RELATED APPLICATIONS

This patent application claims priority from, and incorporates by reference the entire disclosure of, U.S. Provisional Patent Application No. 62/197,474 filed on Jul. 27, 2015.

BACKGROUND

Technical Field

The present disclosure relates generally to metadata generation and more particularly, but not by way of limitation, to systems and methods for domain-specific machine-interpretation of input data.

History of Related Art

Using machines to interpret text is a complicated problem, particularly when the text is not required to be provided in any particular format. Traditional techniques are generally slow to adapt to changes in language and vocabulary and often do not adequately impart meaning to analyzed text.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of machine-interpreting freeform text, the method including, by a computer system, receiving input data over a computer network. The method also includes automatically generating topic-based metadata of the input data in relation to a multi-level taxonomy. The method also includes automatically determining parts of speech of tokens of the input data. The method also includes searching a metadata store using the tokens and the parts of speech, the searching including identifying, at a first level and a second level of the multi-level taxonomy, nodes that include metadata which sufficiently match the tokens and the parts of speech of the tokens, where the searching yields best-match grammar-based metadata. The method of also includes revising the best-match grammar-based metadata based at least in part on the automatically generated topic-based metadata. Other embodiments of this aspect include corresponding computer systems, apparatus, and computer programs recorded on one or more computer storage devices, each configured to perform the actions of the methods.

Another general aspect includes a computer system which includes a processor and memory, where the processor and memory in combination are operable to perform a method. The method includes receiving input data over a computer network. The method also includes automatically generating topic-based metadata of the input data in relation to a multi-level taxonomy. The method also includes automatically determining parts of speech of tokens of the input data. The method also includes searching a metadata store using the tokens and the parts of speech, the searching including identifying, at a first level and a second level of the multi-level taxonomy, nodes that include metadata which sufficiently match the tokens and the parts of speech of the tokens, where the searching yields best-match grammar-based metadata. The method of also includes revising the best-match grammar-based metadata based at least in part on the automatically generated topic-based metadata. Other embodiments of this aspect include corresponding computer systems, apparatus, and computer programs recorded on one or more computer storage devices, each configured to perform the actions of the methods.

Another general aspect includes a computer-program product which includes a non-transitory computer-usable medium having computer-readable program code embodied therein, the computer-readable program code adapted to be executed to implement a method. The method includes receiving input data over a computer network. The method also includes automatically generating topic-based metadata of the input data in relation to a multi-level taxonomy. The method also includes automatically determining parts of speech of tokens of the input data. The method also includes searching a metadata store using the tokens and the parts of speech, the searching including identifying, at a first level and a second level of the multi-level taxonomy, nodes that include metadata which sufficiently match the tokens and the parts of speech of the tokens, where the searching yields best-match grammar-based metadata. The method of also includes revising the best-match grammar-based metadata based at least in part on the automatically generated topic-based metadata. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Computer-automated identification and understanding of unstructured text is a complex technical problem, particularly when the unstructured text is derived from diverse sources. Consider an example of human descriptors. Typically, a human descriptor includes one or more words and/or phrases that describe one or more human attributes such as a human skill, experience with a human-operated tool, combinations of same, or the like. In a simple example, a resume drafted by a potential employee might list skills acquired or possessed, a job description might list skills desired by an employer for a position and a course description for a class or training session might list skills to be taught or demonstrated by an instructor. When many resumes, job descriptions and/or course descriptions are ingested by a computer system, numerous individual vocabularies are in play, thus complicating the problem of matching or relating together unstructured text.

Furthermore, the language underlying unstructured text generally does not remain static. For example, continuing the above example of human descriptors, technology, cultural diversity, the passage of time and other factors may result in new human descriptors being introduced in language on a regular basis. For example, in some cases, a new human descriptor might be a more up-to-date, or "trendy," synonym for another human descriptor. By way of further example, a new human descriptor might refer to a newly developed or newly relevant human attribute (e.g., a new skill that results from research and development, new technology, etc.). Confounding the above problems is the computational and storage expense of processing and storing unstructured text, respectively, in a meaningful way.

The present disclosure describes examples of a computer system that can consume unstructured text on a continuous, ongoing basis and dynamically adapt to changing vocabularies. For illustrative purposes, and to facilitate a better understanding of certain inventive concepts, the present disclosure periodically describes examples of computer systems that can receive documents known to include human descriptors, distinguish between different types of human descriptors, dynamically identify new human descriptors, identify relationships between human descriptors, etc. However, it should appreciated that the principles herein are expressly not limited to human descriptors.

Figure 1:
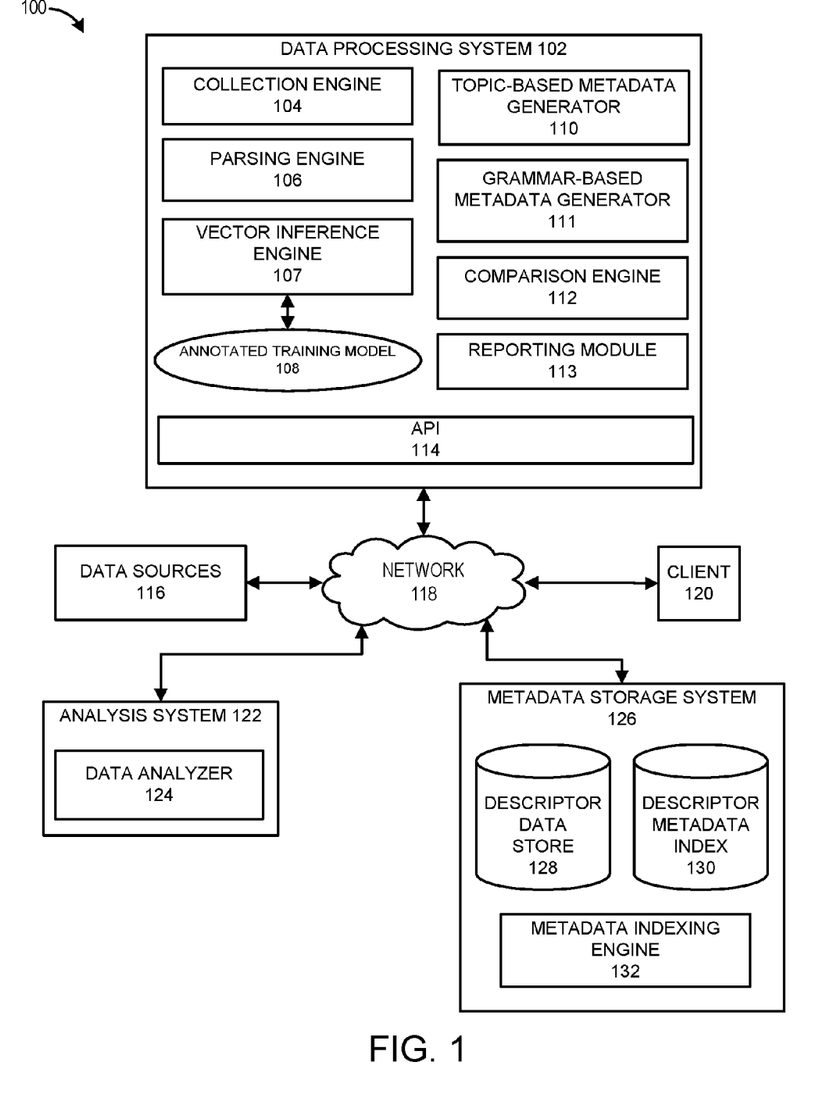
FIG. 1 illustrates an example of a system for machine-interpreting input data for a subject-matter domain of interest.

FIG. 1 illustrates an example of a system 100 for machine-interpreting input data for a subject-matter domain of interest. The system 100 includes a data processing system 102, data sources 116, an analysis system 122, a metadata storage system 122 and one or more client-computing devices 120, each of which is operable to communicate over a network 118. As illustrated, the data processing system 102 can include a collection engine 104, a parsing engine 106, a vector inference engine 107, an annotated training model 108, a topic-based metadata generator 110, a grammar-based metadata generator 111, a comparison engine 112, a reporting module 113 and an application programming interface (API) 114. The analysis system 122 can include one or more data analyzers 124.

Each instance of a system such as, for example, the data processing system 102, the analysis system 122 and the metadata storage system 126, may be representative of any combination of computing equipment including, for example, any number of physical or virtual server computers and any number and organization of databases. In addition, it should be appreciated that, in various embodiments, the network 118 can be viewed as an abstraction of multiple distinct networks via which computer systems may be operable to communicate. For example, the network 118 can include one or multiple communications networks such as, for example, public or private intranets, a public switched telephone network (PSTN), a cellular network, the Internet, or the like.

The metadata storage system 126 can be used to guide machine-interpretation of input text. In certain embodiments, the metadata storage system 126 is tuned to optimize machine interpretation of, and metadata generation for, a subject-matter domain of interest. In general, the subject-matter domain of interest can be at least partially defined by a multi-level taxonomy that ranges from general to specific (e.g., going from root node to leaf nodes). The multi-level taxonomy can be considered a hierarchical arrangement of nodes that each include metadata values.

As shown, the metadata storage system 126 can include a descriptor data store 128, a descriptor metadata index 130 and a metadata indexing engine 132. The descriptor data store 128 can include, in effect, the multi-level taxonomy that at least partially defines the subject-matter domain of interest. In a typical embodiment, the descriptor data store 128 can be relationally accessed for purposes of determining information or values residing at particular nodes or particular sub-trees of the multi-level taxonomy. The descriptor metadata index 130 can include an indexed and searchable form of the multi-level taxonomy. In certain embodiments, the descriptor metadata index 130 can include a part-of-speech tagged version of the multi-level taxonomy such that each word or token at each node of the taxonomy is tagged with a part of speech. In some embodiments, the descriptor metadata index 130 can implement, for example, APACHE LUCENE, XAPIAN, SPHINX, combinations of same and/or the like.

The metadata indexing engine 132 can be executed periodically as data of the descriptor data store 128 and/or the descriptor metadata index 130 changes. For example, the metadata engine 132 can convert text segments and annotations to more efficient, queryable structures. In addition, or alternatively, the metadata indexing engine 132 can take pre-processing steps such as, for example, stemming and lemmatization of individual words, removal of highly-common or irrelevant words, case normalization, and topic annotation via techniques such as latent dirichlet allocation or probabilistic latent semantic analysis.

In certain embodiments, the collection engine 104 can collect unstructured data that includes unstructured or structured input data of the type described above. For example, in some embodiments, the unstructured data can include human descriptors and thus take the form of resumes, job descriptions, course descriptions, combinations of same, or the like. In many cases, the unstructured data can be collected from the data sources 116. In general, the data sources 116 can include any computer system, data store or the like that is operable to provide data. In an example in which the subject-matter domain of interest is human descriptors or human labor, the computer system could be associated with one or more employers, job-posting websites, educational institutions, etc.

The parsing engine 106 can receive input data of the type collected by the collection engine 104, or received via another component such as the reporting module 113, and output domain-relevant textual segments derived from the input data. For example, the parsing engine 106 can divide the input data into textual segments and apply rules so as to remove content that is deemed non-relevant to whatever subject-matter domain is of interest in a given implementation. In some cases, the parsing engine 106 can remove portions of segments. In other cases, the parsing engine 106 can remove entire segments. Example operation of the parsing engine 106 will be described in greater detail with respect to FIG. 3.

The vector inference engine 107 can project data such as text onto a vector space defined by the annotated training model 108, and thereby infer a vector of the input data. In certain embodiments, the vector inference engine 107 can leverage word or document-to-vector implementations such as, for example, WORD2VEC, DOC2VEC, GENSIM, GLOVE (Global Vectors) and/or the like to infer the vector. The annotated training model 108 can include vectors of each document of a corpus on which the vector inference engine 107 has been trained. Each vector of the annotated training model can be annotated, in advance, with topics of the multi-level taxonomy of the subject-matter domain of interest. In an example, if the subject-matter domain of interest is human descriptors or human capital, the annotated training model 108 might annotate each vector with an occupation indicator from the Occupational Information Network (O*NET) model (e.g., a Standard Occupational Classification (SOC) code associated with an occupation represented in the O*NET model). Example operation of the vector inference engine 107 will be described in greater detail with respect to FIG. 4.

The topic-based metadata generator 110 can automatically detect or generate topics of particular data. In some embodiments, the topic generation can be based on word matching or searching with respect to a multi-level taxonomy and/or a pre-classified document corpus. In addition, or alternatively, the topic generation can be based on operation of the vector inference engine 107 with respect to the annotated training model 108. Topic generation using the vector inference engine 107 and the annotated training model 108 will be described in greater detail with respect to FIGS. 3-4.

The grammar-based metadata generator 111 can automatically generate metadata based on grammar or parts of speech of particular data. In some embodiments, the grammar-based metadata generator 111 can empirically determine an initial domain relevance of each of the domain-relevant segments produced, for example, by the parsing engine 106. In addition, the grammar-based metadata generator 111 can part-of-speech tag tokens of particular data and search the descriptor metadata index 130 for the grammar-based metadata. Operation of the grammar-based metadata generator 111 will be described in greater detail with respect to FIGS. 3 and 5.

The comparison engine 112 can be used as a basis to compare two sets of input data such as, for example, two documents, and analyze differences. In various cases, the comparison can be at least partially derived from outputs of the topic-based metadata generator 110 and the grammar-based metadata generator 111. Example operation of the comparison engine 112 will be described in greater detail with respect to FIG. 7.

The API 114 can expose functionality of the data processing system 102 to other analysis systems such as, for example, the analysis system 122. In an example, the analysis system 122 can include a data analyzer 124 that uses the API 114 to achieve additional functionality. In an example in which the subject-matter domain of interest is that of human descriptors or human labor, the data analyzer 124 can use the API 114 to develop a skills profile for an individual based on a source document, align courses or training to particular sets of skills, identify individuals with particular combinations of skills, etc. In various cases, the functionality of the data analyzer 124 can be made available to users of the one or more client-computing devices 120. The one or more client-computing devices 120 can include, for example, desktop computers, laptop computers, tablet computers, smart phones, wearable or body-borne computers, and/or the like.

In certain embodiments, the reporting module 113 can provide information generated by components of the data processing system 102 via the API 114. For example, the reporting module 113 can publish reports or other generated information to a web page, dashboard, and/or the like. A particular example is described with respect to FIG. 6. Additionally, or alternatively, the reporting module 113 can publish the above-described information, or similar information, to files, databases, and/or the like. In various cases, the reporting module 113 can trigger, for example, the collection engine 104 and/or the parsing engine 106 with respect to particular input data. The web page, user dashboard or other user interface(s) output, for example, by the reporting module 113, can be accessed by the one or more client-computing devices 120, either directly or via the API 114. The reporting module 113 can also provide a user interface, for instance, that allows the users of the one or more client-computing devices 120 to provide configuration updates, request particular information, etc.

Figure 2:
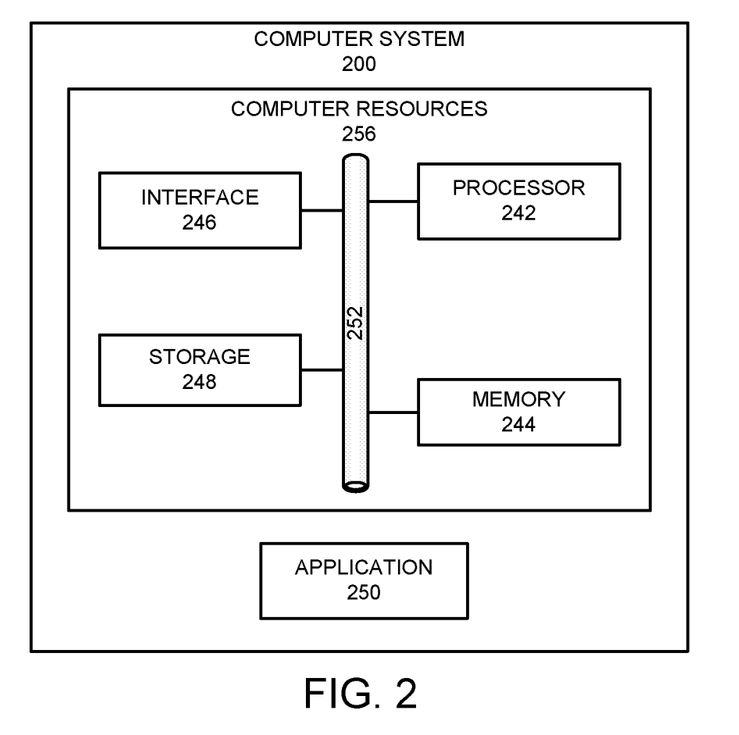
FIG. 2 illustrates an example of an computer system.

FIG. 2 illustrates an example of a computer system 200 that, in some cases, can be representative, for example, of the data processing system 102, the analysis system 122, the metadata storage system 126 and/or the client-computing device 120. The computer system 200 includes an application 250 operable to execute on computer resources 256. The application 250 can be similar, for example, to the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 246 for any one or more of these networks, where appropriate.

In some embodiments, interface 246 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
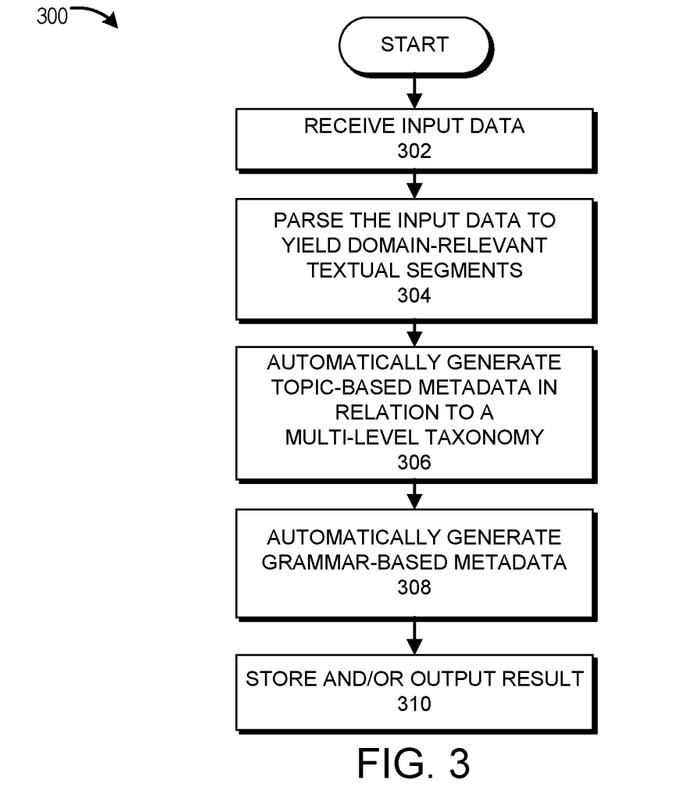
FIG. 3 illustrates an example of a process for machine-interpreting input data.

FIG. 3 illustrates an example of a process 300 for machine-interpreting input data. In general, the process 300, in whole or in part, can be implemented by one or more of the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. The process 300 can also be performed generally by the data processing system 102, the metadata storage system and/or the system 100. Although any number of systems, in whole or in part, can implement the process 300, to simplify discussion, the process 300 will be described in relation to specific systems or subsystems of the system 100.

At block 302, the reporting module 113, the collection engine 104 or another component, receives input data. The input data can be, for example, unstructured or freeform text, structured data, etc. In general, however, the input data is not required to have any particular structure.

At block 304, the parsing engine 106 parses the input data in a domain-sensitive fashion so as to yield domain-relevant segments of the input data. For example, the block 304 can include dividing the input data into segments. The segments into which the input data is divided can be, for example, sentences, sentence fragments, phrases, combinations of words, etc.

The parsing at block 304 can also include removing content deemed non-relevant to a particular subject-matter domain of interest. In some cases, the parsing engine 106 can remove portions of segments. For example, the parsing engine 106 can remove noise words such as conjunctions, articles, punctuation, etc. In other cases, the parsing engine 106 can remove entire segments. For example, if the subject-matter domain of interest is human descriptors or human labor, segments that include language indicative of being legal in nature (e.g., via reference to code or statute) can be removed in their entirety. In a typical embodiment, whatever segments remain following the parsing at block 304 can be considered the domain-relevant segments.

At block 306, the topic-based metadata generator 110 automatically generates topic-based metadata for the input data in relation to a multi-level taxonomy. The multi-level taxonomy can be, for example, a taxonomy derived from O*NET or another taxonomy. According to this example, with reference to O*NET, the topics can be occupations. In some cases, the topics can be identified based on word or token matching between the domain-relevant segments and the multi-level taxonomy (e.g., word matching at a particular level of the multi-level taxonomy). In other cases, the topics can be identified using vector inferences based on the annotated training model 108. An example of identifying topics using vectors inferences based on the annotated training model 108 will be described with respect to FIG. 4.

At block 308, the grammar-based metadata generator 111 automatically generates grammar-based metadata in relation to the multi-level taxonomy. In general, the grammar-based metadata can be generated using the descriptor metadata index 130. Example functionality that the block 308 can include will be described in relation to FIG. 5.

At block 310, the reporting module 113 stores and/or outputs one or more results of the process 300. In many cases, the block 310 can include generating the results. For example, in some embodiments, the results can include the metadata or topics generated by the topic-based metadata generator 110 and/or the grammar-based metadata generator 111. The results can be output, for example, via the reporting module 113 and/or the API 114. In addition, or alternatively, the results can be stored in a data store or other memory.

Figure 4:
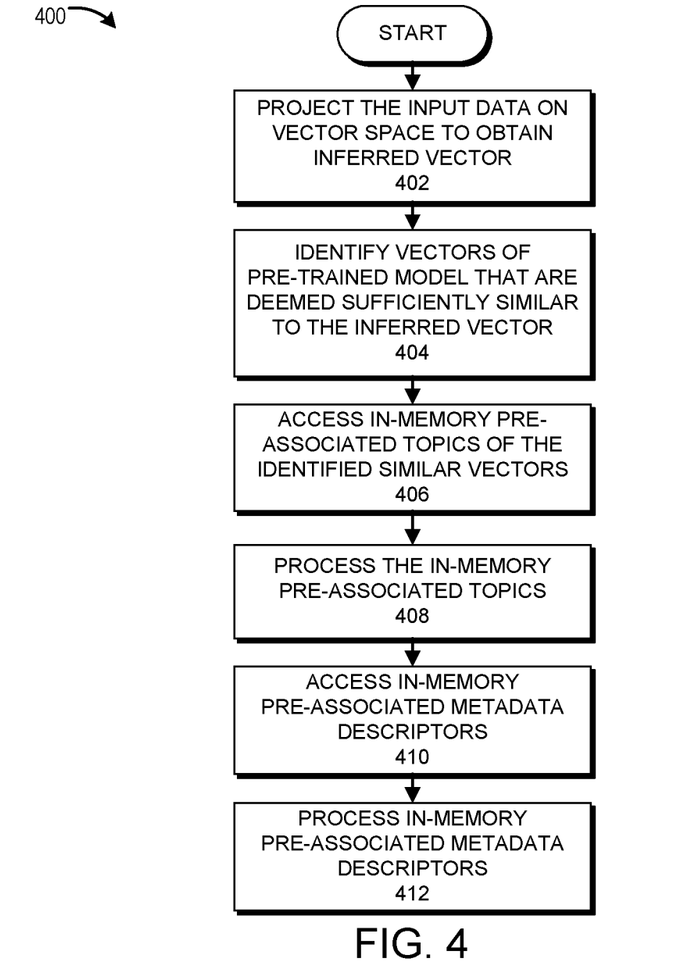
FIG. 4 illustrates an example of a process for automatically generating topic-based metadata.

FIG. 4 illustrates an example of a process 400 for automatically generating topic-based metadata. In certain embodiments, the process 400 can be performed as all or part of the block 306 of FIG. 3. In general, the process 400, in whole or in part, can be implemented by one or more of the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. The process 400 can also be performed generally by the data processing system 102, the metadata storage system and/or the system 100. Although any number of systems, in whole or in part, can implement the process 400, to simplify discussion, the process 400 will be described in relation to specific systems or subsystems of the system 100.

At block 402, the topic-based metadata generator 110 projects particular data on a vector space defined by the annotated training model 108, thereby yielding an inferred vector for the input data. In some cases, the particular data can be, for example, domain-relevant segments output by the parsing engine 106. In other cases, the particular data can be, for example, input data in raw form (e.g., unparsed).

At block 404, the topic-based metadata generator 110 identifies vectors of the annotated training model 108 that are deemed sufficiently similar to the inferred vector. For example, in some embodiments, the topic-based metadata generator 110 can generate a top-N list of similar vectors using, for example, cosine similarity.

At block 406, the topic-based metadata generator 110 accesses in-memory pre-associated topics of the identified similar vectors. In certain embodiments, the in-memory pre-associated topics can be accessed from the annotated training model 108. As described previously, the annotated training model 108 can be annotated with topics such that the block 406 can include looking up each similar vector and retrieving the topic with which the similar vector is annotated.

At block 408, the topic-based metadata generator 110 processes the in-memory pre-associated topics of the identified similar vectors. In many cases, the identified similar vectors can be pre-associated with some of the same topics (e.g., the same SOC codes in a human descriptor or human capital subject-matter domain). Thus, the block 408 can include de-duplicating the pre-associated topics and generating topic-relevancy measures. The topic-relevancy measure of a given topic can be generated in various fashions. In an implementation, the topic-relevancy measure can be computed as a function of the topic's frequency in the topic list (prior to de-duplication) and its cosine similarity to the inferred vector from block 402. For example, in some cases, the topic-relevancy measure can be a sum of the cosine similarity and the frequency, such that the sum is normalized by a highest such measure across the de-duplicated topics. The topic-relevancy measure can also be adjusted by configurable weights. The topic-relevancy measure can also be generated in other suitable ways. In certain embodiments, an output of the block 408 can be a de-duplicated topic list in relation to the topic-relevancy measures.

At block 410, the topic-based metadata generator 110 accesses in-memory pre-associated metadata descriptors of the de-duplicated topics. In certain embodiments, the block 410 can include querying the descriptor data store 128 for metadata descriptors of a configurable sub-tree of the multi-level taxonomy. In general, each of the de-duplicated topics can correspond to a node of the multi-level taxonomy. Therefore, in some implementations, the descriptor data store 128 can be queried for metadata descriptors that are below each de-duplicated topic's corresponding node in the multi-level taxonomy. In some cases, the query can be restricted to a certain number of levels beneath a given de-duplicated topic's node in the multi-level taxonomy. An output of the block 410 can be a list of metadata descriptors resulting from a query of the descriptor data store 128.

At block 412, the topic-based metadata generator 110 processes the in-memory pre-associated metadata descriptors. In many cases, some of the topics may have some of the same pre-associated metadata descriptors. Thus, the block 408 can include de-duplicating the pre-associated metadata descriptors and generating topic-based descriptor-relevancy measures. The topic-based descriptor-relevancy measures can be generated in various fashions.

In an implementation, the topic-based descriptor-relevancy measure of a given descriptor can be computed as a function of the descriptor's frequency in the descriptor list (prior to de-duplication) and the topic-relevancy measure of the topic with which it is pre-associated. For example, in some cases, the topic-based descriptor-relevancy measure can be a sum of the corresponding topic-relevancy measure and the descriptor's frequency, such that the sum is normalized by a highest such measure across the de-duplicated descriptors. The topic-based descriptor-relevancy measure can also be adjusted by configurable weights. The topic-based descriptor-relevancy measure can also be generated in other suitable ways. In certain embodiments, an output of the block 412 can be a de-duplicated descriptor list in relation to the topic-based descriptor-relevancy measures. It should be appreciated that the de-duplicated topics resulting from block 408 can also be considered descriptors. Thus, in some cases, the descriptor list can further include the de-duplicated topics together with the topic-relevancy measure.

A result of the process 400 can be a topic-based descriptor list (including the de-duplicated descriptor list) in relation to the topic-based descriptor-relevancy measures. The topic-based descriptor list and the topic-based relevancy measures can be provided, for example, to the reporting module 113 for further processing and analysis.

Figure 5:
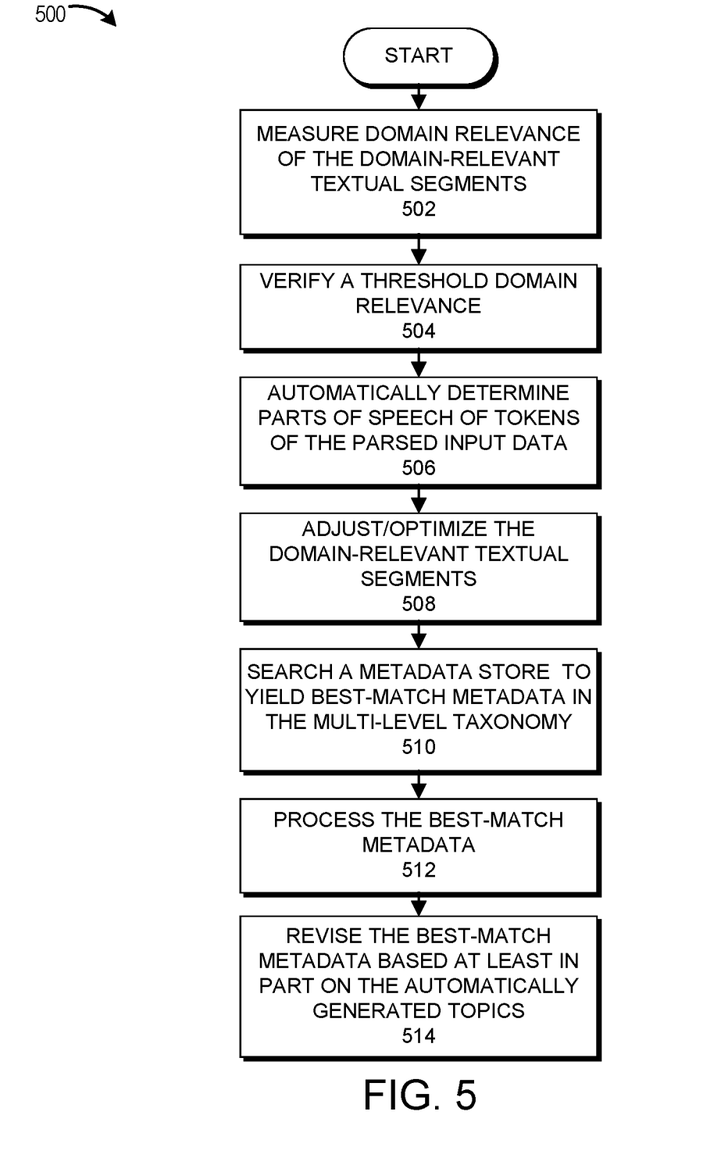
FIG. 5 illustrates an example of a process for automatically generating grammar-based metadata.

FIG. 5 illustrates an example of a process 500 for automatically generating grammar-based metadata. In certain embodiments, the process 500 can be performed as all or part of the block 308 of FIG. 3. In general, the process 500, in whole or in part, can be implemented by one or more of the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. The process 500 can also be performed generally by the data processing system 102, the metadata storage system and/or the system 100. Although any number of systems, in whole or in part, can implement the process 500, to simplify discussion, the process 500 will be described in relation to specific systems or subsystems of the system 100.

At block 502, the grammar-based metadata generator 111, or another component, measures a domain relevance of domain-relevant segments such as, for example, the domain-relevant segments resulting from 304 of FIG. 3. In certain embodiments, the grammar-based metadata generator 111 can measure domain relevance to a particular subject-matter domain using statistical binary classification. In some cases, the statistical binary classification can be based on supervised machine-learning models such as, for example, decision trees, random forests, Bayesian networks, support vector machines, neural networks, logistic regression, combinations of the same and/or the like. In general, the block 502 can yield, with respect to each segment of the domain-relevant segments, a domain relevance value that indicates a statistical likelihood that the segment is a domain-relevant artifact. In some cases, the domain-relevance values can serve as a basis to keep or remove segments (e.g., a rule that requires removal of segments having domain-relevance values below a threshold value).

At block 504, the grammar-based metadata generator 111, or another component, verifies a threshold domain relevance of the domain-relevant segments. In some embodiments, the threshold domain relevance is precondition of executing the process 500. In some embodiments, the threshold domain relevance can be expressed in terms of a number of domain-relevant segments (e.g., a requirement that there be at least three domain-relevant segments). The threshold domain relevance can also be expressed in other ways (e.g., a requirement that the average domain relevance value exceed a certain value). In some cases, if the threshold domain relevance is not achieved, the process 500 can immediately terminate. Additionally, in some embodiments, the block 504 can be omitted such that there is no verification of domain relevance with respect to the process 500.

At block 506, the grammar-based metadata generator 111 automatically determines parts of speech of tokens of the domain-relevant segments. For example, the block 506 can include tokenizing all or a portion of the domain-relevant segments and part-of-speech tagging the tokens. The part-of-speech tagging can occur via any one or combination of algorithms or solutions such as, for example, spaCy, APACHE OpenNLP, CLAWS (Constituent Automatic Word-tagging System), etc.

At block 508, the grammar-based metadata generator 111 adjusts or optimizes the domain-relevant segments and/or the domain-relevance values. The block 508 can include, for example, applying one or more rules. In some cases, the rules can apply knowledge gleaned from the part-of-speech tagging at block 506. In certain embodiments, at block 508, the grammar-based metadata generator 111 can use a vocabulary or dictionary that is specific to the subject-matter domain of interest in combination with the rules.

For example, it may be that a particular domain-relevant segment uses the term "drive." According to this example, if the subject-matter domain of interest is computing and the multi-level taxonomy relates to computing, a segment using "drive" as a noun may be highly relevant (i.e., as potentially referring to "computer drive") while a segment using "drive" as a verb may be less relevant (i.e., as potentially referring to driving a vehicle). Accordingly, continuing this example, if it is determined during the part-of-speech tagging at block 506 that the particular segment uses "drive" as a verb, the segment can be removed from the domain-relevant segments or have its domain-relevance value lowered.

In another example, it may be that a particular domain-relevant segment is recognized as a compound statement (e.g., "The computer includes a motherboard, a video card, and a hard drive."). According to this example, the compound statement can be transformed into two or more separate segments (e.g., "The computer includes a motherboard," "the computer includes a video card," and "the computer includes a hard drive."). Thereafter, the grammar-based metadata generator 111 can cause the separate segments to replace the particular domain-relevant segment in the domain-relevant segments.

At block 510, the grammar-based metadata generator 111 searches a metadata store such as, for example, the descriptor metadata index 130, for best-match metadata using the tokens and the parts of speech from block 506. As described supra, the descriptor metadata index 130 can include a previously part-of-speech-tagged version of the multi-level taxonomy. Thus, as part of the block 510, the grammar-based metadata generator 111 can identify nodes of the multi-level taxonomy that include metadata which sufficiently match both the tokens and the parts of speech of those tokens. The search at block 510 can return matches at multiple levels of the multi-level taxonomy. In some embodiments, the search can be restricted to certain segments or sub-trees of the multi-level taxonomy.

At block 512, the grammar-based metadata generator 111 processes the best-match metadata descriptors. In many cases, some of the metadata descriptors appear multiple times in the search results, or have values returned therewith that are indicative of the number of hits. If necessary, the block 512 can include de-duplicating the best-match descriptors and generating grammar-based descriptor-relevancy measures. The grammar-based descriptor-relevancy measures can be generated in various fashions.

In an implementation, the grammar-based descriptor-relevancy measure of a given descriptor can be computed as a function of the descriptor's frequency in the descriptor list (prior to de-duplication, if necessary) and, in some cases, adjusted by configurable weights. For example, in some cases, the grammar-based descriptor-relevancy measure can be the descriptor's frequency (or a value indicative of same), such that the measure is normalized by a highest such measure across the de-duplicated descriptors. The grammar-based descriptor-relevancy measure can also be generated in other suitable ways. In certain embodiments, an output of the block 512 can be a de-duplicated descriptor list in relation to the grammar-based descriptor-relevancy measures. It should be appreciated that the de-duplicated topics resulting from block 408 can also be considered descriptors. Thus, in some cases, the descriptor list can further include the de-duplicated topics together with the topic-relevancy measure.

At block 514, the grammar-based metadata generator 111 revises the best-match metadata based at least in part on automatically generated topics such as, for example, the in-memory pre-associated topics from block 406 of FIG. 4. As described previously, the in-memory pre-associated topics each can correspond to a particular level of the multi-level taxonomy of the subject-matter domain of interest. The block 514 can include, for example, analyzing hierarchical relationships between the topics from block 406 and the best-match metadata and adjusting the grammar-based descriptor-relevancy measures.

In an example, best-match data that appear among the topics from block 406 of FIG. 4, or that are hierarchically related to such a topic, for example, by corresponding to a child node of the topic in the multi-level taxonomy, can have their grammar-based relevancy measures configurably boosted (e.g., ten percent, twenty-five percent, etc.). In certain embodiments, closer relationships can be given a greater boost. For example, best-match metadata that corresponds to a same node as one of the topics from block 406 of FIG. 4 can be given a greater boost, while the boost can be gradually diminished for child-node matches. In addition, in some embodiments, the amount of the boost can factor in the topic-relevancy measures for the topics (e.g., giving greater boosts for higher topic-relevancy measures).

A result of the process 500 can be a grammar-based descriptor list (including the best-match metadata) in relation to the grammar-based relevancy measures (as potentially revised at block 514). The grammar-based descriptor list and the grammar-based relevancy measures can be provided, for example, to the reporting module 113 for further processing and analysis.

Figure 6:
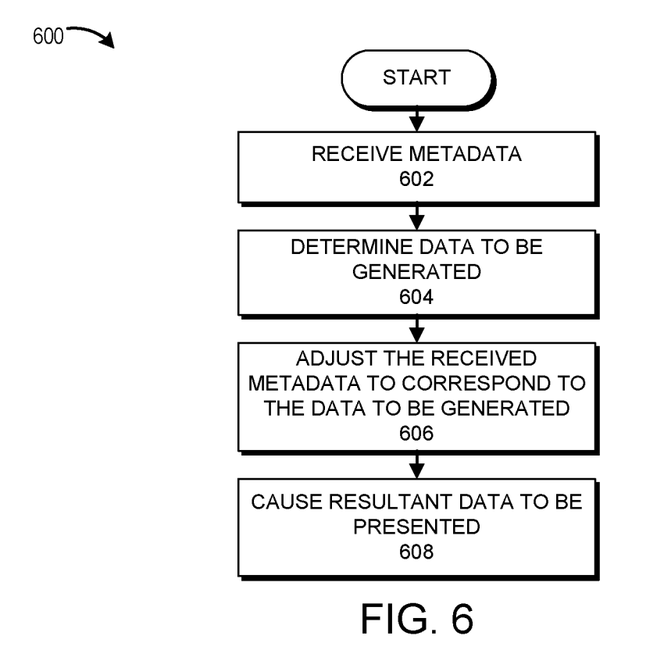
FIG. 6 illustrates an example of a process reporting on machine-generated metadata.

FIG. 6 illustrates an example of a process 600 reporting on machine-generated metadata. In certain embodiments, the process 600 can be performed as all or part of the block 310 of FIG. 3. In general, the process 600, in whole or in part, can be implemented by one or more of the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. The process 600 can also be performed generally by the data processing system 102, the metadata storage system and/or the system 100. Although any number of systems, in whole or in part, can implement the process 600, to simplify discussion, the process 600 will be described in relation to specific systems or subsystems of the system 100.

At block 602, the reporting module 113 receives metadata produced by the topic-based metadata generator 110 and/or the grammar-based metadata generator 111. For example, the reporting module 113 can receive topic-based metadata (e.g., including a topic-based descriptor list in relation to topic-based relevancy measures as described with respect to FIG. 4) and grammar-based metadata (e.g., including a grammar-based descriptor list in relation to grammar-based relevancy measures as described with respect to FIG. 5).

At block 604, the reporting module 113 determines the data to be generated. In a typical embodiment, the data to be generated can be specified by user input, a report format, etc. In some embodiments, the block 604 can include determining a target level of the multi-level taxonomy at which each portion of the metadata is to be returned. For example, if the subject-matter domain of interest relates to human descriptors or human labor and the multi-level taxonomy is O*NET or an extension of O*NET, the target level might be, for instance, detailed work activities. Some of the descriptors might relate to tasks or skills that appear at nodes beneath the detailed work activities in the multi-level taxonomy. The target levels for the grammar-based metadata and the topic-based metadata can be different.

At block 606, the reporting module 113 adjusts the received metadata to correspond to the data to be generated. If the reporting module 113 previously determined a target level with respect to the topic-based metadata, the reporting module 113 can, in effect, generate a new topic-based descriptor list in relation to new topic-based relevancy measures. Similarly, if the reporting module 113 previously determined a target level with respect to the grammar-based metadata, the reporting module 113 can, in effect, generate a new grammar-based descriptor list in relation to new grammar-based relevancy measures.

In an example, the new topic-based descriptor list can include those descriptors of the topic-based descriptor list that reside at the target level in the multi-level taxonomy. Descriptors not residing at the target level can be replaced in the new topic-based descriptor list by a descriptor corresponding to their parent node at the target level (to the extent that node is not already represented). The new topic-based relevancy measures can, in effect, represent a roll-up, to the target level, of the original topic-based relevancy measures, and can be determined in similar fashion to the original topic-based relevancy measures. For example, the new topic-based relevancy measures can represent higher measures for greater numbers of hits and/or hits at higher levels of the hierarchy. The new grammar-based descriptor list and the new grammar-based relevancy measures can be generated in similar fashion to the new topic-based descriptor list and the new topic-based relevancy measures, respectively. It should be appreciated that, in some cases, there may not be any target level such that all metadata is retained and presented.

As noted above, the grammar-based metadata can include matches at the target level of the multi-level taxonomy (if any) and also other levels beneath the target level. In various embodiments, numerous technical advantages can be realized due, at least in part, to the multi-level search results. First, for example, the search can be initiated at multiple levels of the taxonomy even when it is known that the target level is of interest. For example, suppose the multi-level taxonomy is a tree structure of ten hierarchical levels, such that the root level is level one and the leaf level is level ten. According to this example, if level seven is the target level, levels eight through ten can also be searched and have those results factored into the analysis of the nodes at level seven (e.g., the analysis occurring at the reporting module 113). Advantageously, in certain embodiments, more granular metadata residing at lower levels of the multi-level taxonomy than the target level can be leveraged to produce improved search results. Stated somewhat differently, multiple levels of the multi-level taxonomy can be traversed as part of the search. In general, the fact that a given node's children resulted in matches would increase the quality of that node's match.

At block 608, the reporting module 114 causes resultant data to be presented. For example, if the input data received, for example, at block 302 of FIG. 3 is a resume, the resultant data might include detailed work activities or skills ultimately resulting from a topic-based analysis of vectors deemed similar to a vector representation of the resume. Continuing this example, resultant data might include detailed work activities or skills ultimately resulting from a part-of-speech based analysis of the input data.

Figure 7:
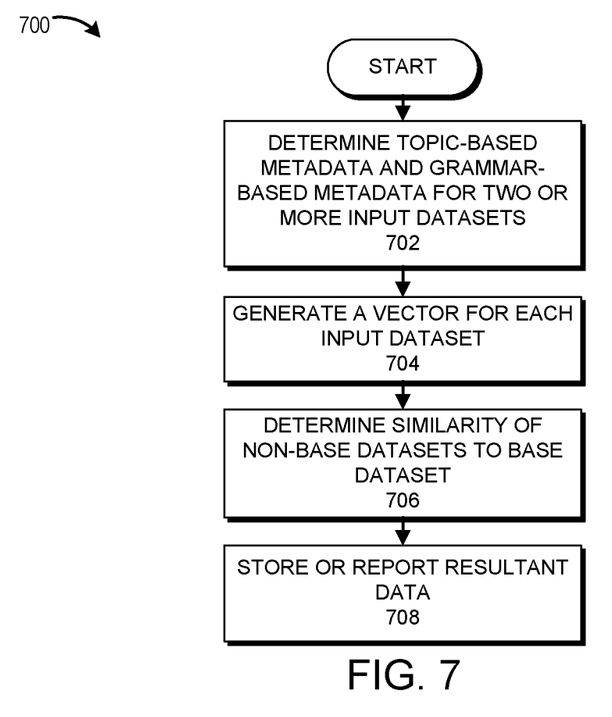
FIG. 7 illustrates an example of a process for comparing datasets using machine-generated metadata.

FIG. 7 illustrates an example of a process 700 for comparing datasets using machine-generated metadata. In general, the process 700, in whole or in part, can be implemented by one or more of the collection engine 104, the parsing engine 106, the vector inference engine 107, the topic-based metadata generator 110, the grammar-based metadata generator 111, the comparison engine 112, the reporting module 113, the data analyzer 124 and/or the metadata indexing engine 132. The process 700 can also be performed generally by the data processing system 102, the metadata storage system and/or the system 100. Although any number of systems, in whole or in part, can implement the process 700, to simplify discussion, the process 700 will be described in relation to specific systems or subsystems of the system 100.

At block 702, the comparison engine 112 determines grammar-based metadata and topic-based metadata for two or more input datasets. In general, one of the input datasets serves as a base dataset for the comparison, while the other datasets are to be compared to the base dataset. At block 704, the comparison engine 112 generates a vector for each dataset from the grammar-based metadata and the topic-based metadata for the dataset. In various embodiments, the comparison engine 112 can leverage, for example, WORD2VEC, DOC2VEC, GENSIM, GLOVE (Global Vectors) and/or the like to generate the vectors.

At block 706, the comparison engine 112 determines the similarity of the vector of each non-base dataset to the vector of the base dataset. In some embodiments, the similarity can be determined, for example, using cosine similarity. At block 708, the determined similarity can be stored in memory, output via the reporting module 113, transmitted over the network 118, combinations of same and/or the like.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of machine-interpreting freeform text, the method comprising, by a computer system:
receiving input text over a computer network;
projecting, using a vector inference engine of the computer system, the input text on a vector space defined by a pre-trained model, the pre-trained model comprising vectors that have been annotated with topics of a multi-level taxonomy, the vector inference engine having been trained via the pre-trained model, the projecting yielding an inferred vector;
identifying vectors of the pre-trained model that are deemed sufficiently similar to the inferred vector;
accessing, from the pre-trained model, in-memory pre-associated topics of the identified vectors;
processing the in-memory pre-associated topics, the processing the in-memory pre-associated topics yielding a de-duplicated topic list in relation to topic-relevancy measures;
querying a descriptor data store for in-memory pre-associated metadata descriptors of the de-duplicated topic list, wherein the in-memory pre-associated metadata descriptors correspond to nodes of the multi-level taxonomy;
processing the in-memory pre-associated metadata descriptors, the processing the in-memory pre-associated metadata descriptors yielding a de-duplicated topic-based descriptor list in relation to topic-based descriptor-relevancy measures;
automatically determining parts of speech of tokens of the input text;
searching a metadata store using the tokens and the parts of speech, the metadata store comprising a part-of-speech tagged version of the multi-level taxonomy, the searching comprising identifying, at a first level and a second level of the multi-level taxonomy, nodes that include metadata which sufficiently match the tokens and the parts of speech of the tokens, wherein the searching yields best-match grammar-based metadata descriptors, wherein the best-match grammar-based metadata descriptors correspond to nodes of the multi-level taxonomy;
processing the best-match grammar-based metadata descriptors, the processing the best-match grammar-based metadata descriptors yielding a de-duplicated grammar-based descriptor list in relation to grammar-based descriptor-relevancy measures;
analyzing, relative to the multi-level taxonomy, hierarchical relationships between the de-duplicated grammar-based descriptor list and the de-duplicated topic-based descriptor list;
configurably boosting at least a portion of the grammar-based descriptor-relevancy measures responsive to the analyzing; and
storing the de-duplicated topic-based descriptor list, the topic-based descriptor-relevancy measures, the de-duplicated grammar-based descriptor list and the grammar-based descriptor-relevancy measures in relation to the input text.

2. The method of claim 1, comprising:
parsing the input text to yield a segment collection comprising domain-relevant textual segments in relation to domain-relevance values, wherein the parsing comprises
dividing the input text into textual segments; and
removing, from the divided input text, content deemed non-relevant to a particular domain, wherein the removing yields the domain-relevant textual segments; and
wherein the projecting and the automatically determining parts of speech are performed on the parsed input text.

3. The method of claim 2, comprising, prior to the automatically determining parts of speech:
- measuring domain relevance of the domain-relevant textual segments to the particular domain, wherein the measuring domain relevance yields the domain-relevance values; and
- verifying a threshold domain relevance of the parsed input text as a precondition of executing the automatically determining parts of speech, wherein the verifying is based at least in part on the domain-relevance values.

4. The method of claim 3, the method comprising:
- prior to the searching, adjusting the segment collection in a rule-based fashion; and
- wherein the searching is performed using the adjusted segment collection.

5. The method of claim 4, the adjusting comprising:
- recognizing a compound statement in a particular textual segment of the textual segments;
- transforming the compound statement into two or more separate segments; and
- causing the two or more separate segments to replace the particular textual segment in the segment collection.

6. The method of claim 4, the adjusting comprising removing a particular textual segment from the segment collection based at least in part on a result of the automatically determining parts of speech.

7. The method of claim 4, wherein the adjusting comprises removing a textual segment from the segment collection.

8. The method of claim 4, wherein the adjusting comprises removing a portion of a textual segment in the segment collection.

9. The method of claim 1, wherein the configurably boosting comprises boosting grammar-based relevancy measures of particular grammar-based metadata based, at least in part, on a determination that the particular grammar-based metadata and particular topic-based metadata correspond to a same node of the multi-level taxonomy.

10. The method of claim 1, wherein the configurably boosting comprises boosting grammar-based relevancy measures of particular grammar-based metadata based, at least in part, on a determination that the particular grammar-based metadata corresponds to a child node of particular topic-based metadata in the multi-level taxonomy.

11. A computer system comprising a processor and memory, wherein the processor and memory in combination are operable to perform a method comprising:
- receiving input text over a computer network;
- projecting, using a vector inference engine of the computer system, the input text on a vector space defined by a pre-trained model, the pre-trained model comprising vectors that have been annotated with topics of a multi-level taxonomy, the vector inference engine having been trained via the pre-trained model, the projecting yielding an inferred vector;
- identifying vectors of the pre-trained model that are deemed sufficiently similar to the inferred vector;
- accessing, from the pre-trained model, in-memory pre-associated topics of the identified vectors;
- processing the in-memory pre-associated topics, the processing the in-memory pre-associated topics yielding a de-duplicated topic list in relation to topic-relevancy measures;
- querying a descriptor data store for in-memory pre-associated metadata descriptors of the de-duplicated topic list, wherein the in-memory pre-associated metadata descriptors correspond to nodes of the multi-level taxonomy;
- processing the in-memory pre-associated metadata descriptors, the processing the in-memory pre-associated metadata descriptors yielding a de-duplicated topic-based descriptor list in relation to topic-based descriptor-relevancy measures;
- automatically determining parts of speech of tokens of the input text;
- searching a metadata store using the tokens and the parts of speech, the metadata store comprising a part-of-speech tagged version of the multi-level taxonomy, the searching comprising identifying, at a first level and a second level of the multi-level taxonomy, nodes that include metadata which sufficiently match the tokens and the parts of speech of the tokens, wherein the searching yields best-match grammar-based metadata descriptors, wherein the best-match grammar-based metadata descriptors correspond to nodes of the multi-level taxonomy;
- processing the best-match grammar-based metadata descriptors, the processing the best-match grammar-based metadata descriptors yielding a de-duplicated grammar-based descriptor list in relation to grammar-based descriptor-relevancy measures;
- analyzing, relative to the multi-level taxonomy, hierarchical relationships between the de-duplicated grammar-based descriptor list and the de-duplicated topic-based descriptor list;
- configurably boosting at least a portion of the grammar-based descriptor-relevancy measures responsive to the analyzing; and
- storing the de-duplicated topic-based descriptor list, the topic-based descriptor-relevancy measures, the de-duplicated grammar-based descriptor list and the grammar-based descriptor-relevancy measures in relation to the input text.

12. The computer system of claim 11, the method comprising:
- parsing the input text to yield a segment collection comprising domain-relevant textual segments in relation to domain-relevance values, wherein the parsing comprises
  - dividing the input text into textual segments; and
  - removing, from the divided input text, content deemed non-relevant to a particular domain, wherein the removing yields the domain-relevant textual segments; and
- wherein the projecting and the automatically determining parts of speech are performed on the parsed input text.

13. The computer system of claim 12, the method comprising, prior to the automatically determining parts of speech:
- measuring domain relevance of the domain-relevant textual segments to the particular domain, wherein the measuring domain relevance yields the domain-relevance values; and
- verifying a threshold domain relevance of the parsed input text as a precondition of executing the automatically determining parts of speech, wherein the verifying is based at least in part on the domain-relevance values.

14. The computer system of claim 13, the method comprising:
- prior to the searching, adjusting the segment collection in a rule-based fashion; and wherein the searching is performed using the adjusted segment collection.

15. The computer system of claim 14, the adjusting comprising:
  recognizing a compound statement in a particular textual segment of the textual segments;
  transforming the compound statement into two or more separate segments; and
  causing the two or more separate segments to replace the particular textual segment in the segment collection.

16. The computer system of claim 14, the adjusting comprising removing a particular textual segment from the segment collection based at least in part on a result of the automatically determining parts of speech.

17. The computer system of claim 11, wherein the configurably boosting comprises boosting grammar-based relevancy measures of particular grammar-based metadata based, at least in part, on a determination that the particular grammar-based metadata and particular topic-based metadata correspond to a same node of the multi-level taxonomy.

18. A computer-program product comprising a non-transitory computer-usable medium having computer-readable program code embodied therein, the computer-readable program code adapted to be executed to implement a method comprising:
  receiving input text over a computer network;
  projecting, using a vector inference engine, the input text on a vector space defined by a pre-trained model, the pre-trained model comprising vectors that have been annotated with topics of a multi-level taxonomy, the vector inference engine having been trained via the pre-trained model, the projecting yielding an inferred vector;
  identifying vectors of the pre-trained model that are deemed sufficiently similar to the inferred vector;
  accessing, from the pre-trained model, in-memory pre-associated topics of the identified vectors;
  processing the in-memory pre-associated topics, the processing the in-memory pre-associated topics yielding a de-duplicated topic list in relation to topic-relevancy measures;
  querying a descriptor data store for in-memory pre-associated metadata descriptors of the de-duplicated topic list, wherein the in-memory pre-associated metadata descriptors correspond to nodes of the multi-level taxonomy;
  processing the in-memory pre-associated metadata descriptors, the processing the in-memory pre-associated metadata descriptors yielding a de-duplicated topic-based descriptor list in relation to topic-based descriptor-relevancy measures;
  automatically determining parts of speech of tokens of the input text;
  searching a metadata store using the tokens and the parts of speech, the metadata store comprising a part-of-speech tagged version of the multi-level taxonomy, the searching comprising identifying, at a first level and a second level of the multi-level taxonomy, nodes that include metadata which sufficiently match the tokens and the parts of speech of the tokens, wherein the searching yields best-match grammar-based metadata descriptors, wherein the best-match grammar-based metadata descriptors correspond to nodes of the multi-level taxonomy;
  processing the best-match grammar-based metadata descriptors, the processing the best-match grammar-based metadata descriptors yielding a de-duplicated grammar-based descriptor list in relation to grammar-based descriptor-relevancy measures;
  analyzing, relative to the multi-level taxonomy, hierarchical relationships between the de-duplicated grammar-based descriptor list and the de-duplicated topic-based descriptor list;
  configurably boosting at least a portion of the grammar-based descriptor-relevancy measures responsive to the analyzing; and
  storing the de-duplicated topic-based descriptor list, the topic-based descriptor-relevancy measures, the de-duplicated grammar-based descriptor list and the grammar-based descriptor-relevancy measures in relation to the input text.

* * * * *